US010851797B2

United States Patent
Gupta et al.

(10) Patent No.: US 10,851,797 B2
(45) Date of Patent: Dec. 1, 2020

(54) TURBOCHARGER, NOZZLE VANE FOR TURBOCHARGER, AND TURBINE

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 27 days.

(21) Appl. No.: 16/309,669

(22) PCT Filed: Dec. 21, 2016

(86) PCT No.: PCT/JP2016/088037
§ 371 (c)(1),
(2) Date: Dec. 13, 2018

(87) PCT Pub. No.: WO2018/116395
PCT Pub. Date: Jun. 28, 2018

(65) Prior Publication Data
US 2019/0309640 A1 Oct. 10, 2019

(51) Int. Cl.
*F04D 29/24* (2006.01)
*F01D 5/14* (2006.01)
(Continued)

(52) U.S. Cl.
CPC ............ *F04D 29/242* (2013.01); *F01D 5/141* (2013.01); *F01D 9/041* (2013.01); *F01D 9/048* (2013.01);
(Continued)

(58) Field of Classification Search
CPC . F01D 1/08; F01D 5/145; F01D 5/148; F01D 5/141; F01D 9/045; F01D 9/048;
(Continued)

(56) References Cited

U.S. PATENT DOCUMENTS 6,755,612 B2   6/2004 Shahpar et al.
9,528,386 B2 * 12/2016 Morita ................ F01D 5/141
(Continued)

FOREIGN PATENT DOCUMENTS

CN           103946487 A     7/2014
DE   10 2009 020 591 A1    11/2010
(Continued)

OTHER PUBLICATIONS

Extended European Search Report dated Dec. 10, 2019 issued in the corresponding European Application No. 16924273.2.
(Continued)

*Primary Examiner* — J. Todd Newton
*Assistant Examiner* — Sang K Kim
(74) *Attorney, Agent, or Firm* — Birch, Stewart, Kolasch & Birch LLP (57) ABSTRACT

A turbocharger includes: a turbine wheel; a hub-side wall surface and a shroud-side wall surface which face each other and which together form a flow path for exhaust gas to flow into the turbine wheel; and a nozzle vane which has a shroud-side end surface facing the shroud-side wall surface and a hub-side end surface facing the hub-side wall surface and which is rotatably disposed in the flow path. The nozzle vane has a pressure surface which is, at least on a shroud side, oblique toward a downstream side of the exhaust gas with a distance in a vane height direction from the shroud-side end surface.

9 Claims, 6 Drawing Sheets (51) Int. Cl.
    *F01D 9/04*     (2006.01)
    *F01D 17/16*     (2006.01)
    *F02B 37/24*     (2006.01)

(52) U.S. Cl.
    CPC ............ *F01D 17/165* (2013.01); *F02B 37/24* (2013.01); *F04D 29/24* (2013.01); *F05D 2220/40* (2013.01); *F05D 2240/121* (2013.01); *F05D 2240/122* (2013.01); *F05D 2240/123* (2013.01); *F05D 2240/124* (2013.01); *Y02T 10/12* (2013.01)

(58) Field of Classification Search
    CPC . F01D 9/02; F01D 9/026; F04D 29/24; F04D 29/242; F04D 29/30; F02B 37/24; F05D 2240/121; F05D 2240/122; F05D 2240/123; F05D 2240/124
    See application file for complete search history.

(56) References Cited

U.S. PATENT DOCUMENTS

| | | | |
|---|---|---|---|
| 10,072,513 B2* | 9/2018 | Osako | F01D 17/165 |
| 2005/0220616 A1* | 10/2005 | Vogiatzis | F01D 5/141 |
| | | | 415/208.1 |
| 2011/0206500 A1 | 8/2011 | Nagao et al. | |
| 2014/0341729 A1 | 11/2014 | Osako et al. | |
| 2019/0101018 A1* | 4/2019 | Yoshida | F02C 6/12 |

FOREIGN PATENT DOCUMENTS

| | | |
|---|---|---|
| EP | 2 787 181 A1 | 10/2014 |
| EP | 3 412 889 A1 | 12/2018 |
| JP | 11-229815 A | 8/1999 |
| JP | 2012-21475 A | 2/2012 |
| JP | 2013-137017 A | 7/2013 |
| WO | WO 2008/101105 A2 | 8/2008 |
| WO | WO 2010/052911 A1 | 5/2010 |

OTHER PUBLICATIONS

International Preliminary Report on Patentability and English translation of the Written Opinion of the International Searching Authority for International Application No. PCT/JP2016/088037, dated Jul. 4, 2019.
International Search Report for International Application No. PCT/JP2016/088037 dated Feb. 21, 2017.
Japanese Notice of Reasons for Refusal dated Apr. 16, 2019, for Japanese Patent Application No. 2018-530930, with machine translation.
Japanese Notice of Reasons for Refusal dated Jul. 16, 2019, for Japanese Patent Application No. 2018-530930, with machine translation.
Extended European Search Report dated Dec. 10, 2019 issued in the corresponding European Application No. 16924655.0.
International Preliminary Report on Patentability and Written Opinion of the International Searching Authority, dated Jul. 4, 2019, for corresponding International Application No. PCT/JP2016/088036, with an English translation of the Written Opinion.
International Search Report, dated Feb. 14, 2017, for International Application No. PCT/JP2016/088036, with an English translation.
Japanese Office Action, dated May 7, 2019, for Japanese Application No. 2018-530168, with an English machine translation.
U.S. Office Action, dated Apr. 3, 2020, for U.S. Appl. No. 16/315,003.
Chinese Office Action dated Apr. 29, 2020, issued in counterpart Chinese Application No. 201680087001.1 with an English Translation.
Office Action dated Jul. 9, 2020 issued in relevant Chinese Application No. 201680087714.8 with machine translation.
U.S. Notice of Allowance dated Jul. 31, 2020 for U.S. Appl. No. 16/315,003.

* cited by examiner

TURBOCHARGER, NOZZLE VANE FOR TURBOCHARGER, AND TURBINE

TECHNICAL FIELD

The present disclosure relates to a turbocharger, a nozzle vane for a turbocharger, and a turbine.

BACKGROUND ART

A turbocharger including a nozzle vane which adjusts a flow of exhaust gas flowing into a turbine rotor blade is used.

For instance, Patent Document 1 discloses a turbocharger including a radial turbine which includes a plurality of nozzle vanes arranged in the circumferential direction, on the inner side of a scroll through which working gas flows. The nozzle vane used in this turbocharger has a shape which bulges toward the pressure surface at both end portions with respect to the width direction of the nozzle vane, compared to the center portion, at the leading edge portion and the trailing edge portion. With such a shape of the nozzle vane, collision loss of the working gas is reduced on the leading edge side, and the flow of working gas flowing out from the nozzle is uniformized on the trailing edge side, so as to reduce the secondary flow loss at the nozzle vane and the rotary blade.

CITATION LIST

Patent Literature

Patent Document 1: JP2013-137017A

SUMMARY

Problems to be Solved

Meanwhile, for a turbocharger including a nozzle vane with a variable opening degree, one may consider improving the exhaust gas flow characteristics in a region from the nozzle throat to the turbine rotor blade inlet, at the time when the opening degree of the nozzle vane is small, in order to improve the turbine performance under operational conditions where the flow rate of exhaust gas flowing into the turbine is low.

However, under the operational conditions where the opening degree of the nozzle vane is small, the width of the nozzle throat is narrow, and exhaust gas flows through the nozzle throat toward the turbine rotor blade while having a strong swirl component. Thus, it is difficult to control the flow of exhaust gas in the above described region, and it is difficult to improve the turbine efficiency under the operational conditions where the opening degree of the nozzle vane is small.

In view of the above, at least one embodiment of the present invention is to provide a turbocharger, a nozzle vane for a turbocharger, and a turbine, whereby it is possible to improve the turbine efficiency at the time when the opening degree of the nozzle vane is small.

Solution to the Problems (1) A turbocharger according to at least one embodiment of the present invention includes: a turbine; a hub-side wall surface and a shroud-side wall surface which face each other and which together form a flow path for exhaust gas to flow into the turbine; and a nozzle vane which has a shroud-side end surface facing the shroud-side wall surface and a hub-side end surface facing the hub-side wall surface and which is rotatably disposed in the flow path. The nozzle vane has a pressure surface which is, at least on a shroud side, oblique toward a downstream side of the exhaust gas with a distance in a vane height direction from the shroud-side end surface.

According to findings of the present inventors, under such operational conditions that the exhaust gas flow rate is low and the opening degree of the nozzle vane is small, a centrifugal force is applied to the flow of exhaust gas flowing toward the turbine blade through the nozzle vane, and the flow is deflected toward the shroud. In this case, the flow velocity of the flow of exhaust gas in the turbine has such a flow-velocity distribution that the flow velocity is relatively low on the hub side, and relatively high on the shroud side. In a case where the flow has the above flow-velocity distribution, when the centrifugal force is no longer applied after passing through the turbine blade, the flow becomes mixed to gain a uniform flow velocity, which causes mixing loss. Further, since exhaust gas tends to be deflected toward the shroud, while the exhaust gas flow performs work on the shroud side of the turbine blade, not much work is performed on the hub side, which may cause deterioration of the turbine efficiency.

In this regard, with the above configuration (1), the pressure surface of the nozzle vane is oblique toward the downstream side of exhaust gas with distance from the shroud-side end surface, at least on the shroud side (that is, the pressure surface of the nozzle vane is oblique so that the shroud-side end surface is positioned on the upstream side). Thus, even under operational conditions with a low exhaust-gas flow rate, it is possible to suppress deflection of the flow of exhaust gas flowing into the turbine toward the shroud side. Thus, the flow-velocity distribution of exhaust gas flowing into the turbine becomes more uniform, which makes it possible to reduce mixing loss which may be generated after passing through the turbine blade, and to suppress uneven distribution of work between the hub side and the shroud side of the turbine blade. Thus, with the above configuration (1), it is possible to improve the turbine efficiency under operational conditions where the opening degree of the nozzle vane is small.

(2) In some embodiments, in the above configuration (1), when an x-axis is taken along a normal direction of a camber line of the nozzle vane from the pressure surface toward a suction surface of the nozzle vane, and a y-axis is taken along the vane height direction from the hub-side end surface toward the shroud-side end surface, coordinates ($x_s$, $y_s$) of the suction surface on a trailing edge side of the nozzle vane and coordinates ($x_p$, $y_p$) of the pressure surface on a leading edge side of the nozzle vane satisfy the following relational expression within a positional range in the vane height direction including the shroud-side end surface:

$$0 < \frac{dy_s}{dx_s} < \frac{dy_p}{dx_p}$$

Under operational conditions where the opening degree of the nozzle vane is small, swirls may be generated due to interaction between the exhaust flow passing through the vicinity of the clearance of the throat between the nozzle vanes (throat flow) and the exhaust flow passing through the clearance formed between the wall surface forming the exhaust gas flow path and the nozzle vane (clearance flow), which may deteriorate the turbine efficiency.

In this regard, with the above configuration (2), the slope $(dy_s/dx_s)$ of the suction surface on the side of the trailing edge of the nozzle vane is smaller than the slope $(dy_p/dx_p)$ of the pressure surface on the side of the leading edge of the nozzle vane, within the positional range in the vane height direction (y-axis direction) including the shroud-side end surface. Thus, the throat formed between the nozzle vanes has a narrower throat width at the position of the shroud-side end surface of the nozzle vane, than at the position closer to the hub from the shroud-side end surface.

That is, the throat has a relatively narrow throat width at the position of the shroud-side end surface of the nozzle vane, and thus it is possible to reduce the exhaust gas flow passing by the shroud side of the throat. Thus, in a case where the clearance is formed between the nozzle vane and the shroud-side wall surface, it is possible to suppress generation of swirls due to interaction between the clearance flow and the throat flow passing by the shroud side of the throat. Further, since the throat has a relatively wide throat width at a position closer to the hub from the shroud-side end surface, it is possible to ensure a throat area even when the opening degree of the nozzle vane is small, and to ensure a sufficient flow rate of exhaust gas that passes between the nozzle vanes.

Thus, with the above configuration (2), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(3) In some embodiments, in the above configuration (1) or (2), the nozzle vane has: a first end surface which is one of the shroud-side end surface or the hub-side end surface; and a second end surface which is the other of the shroud-side end surface or the hub-side end surface. The nozzle vane is rotatably supported on one of the hub-side wall surface or the shroud-side wall surface which faces the second end surface, and the suction surface on a trailing edge side of the nozzle vane has, in a cross-section including a normal direction of a camber line of the nozzle vane and the vane height direction, a concave shape from a position of the first end surface to a middle position between the first end surface and the second end surface.

In a case where the nozzle vane is supported rotatably on one of the hub-side wall surface or the shroud-side wall surface on the side of the second end surface, a clearance is normally formed between the first end surface of the nozzle vane and the other one of the hub-side wall surface or the shroud-side wall surface.

In the above configuration (3), the suction surface on the side of the trailing edge of the nozzle vane has a concave shape from the position of the first end surface to the middle position. Thus, the throat formed between the nozzle vanes tends to have a throat width that is narrower at the position of the first end surface of the nozzle vane facing the clearance than at the middle position between the opposite end surfaces (the first end surface and the second end surface) of the nozzle vane.

That is, the throat has a relatively narrow throat width on the side of the first end surface of the nozzle vane, and thus it is possible to reduce the exhaust gas flow passing by the first end surface of the throat. Thus, it is possible to suppress generation of swirls due to interaction between the throat flow and the clearance flow. Further, since the throat has a relatively wide throat width in the vicinity of the middle position, it is possible to ensure a throat area even when the opening degree of the nozzle vane is small, and to ensure a sufficient flow rate of exhaust gas that passes between the nozzle vanes.

Thus, with the above configuration (3), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(4) In some embodiments, in any one of the above configurations (1) to (3), the nozzle vane has: a first end surface which is one of the shroud-side end surface or the hub-side end surface; and a second end surface which is the other of the shroud-side end surface or the hub-side end surface. The nozzle vane is rotatably supported on one of the hub-side wall surface or the shroud-side wall surface which faces the second end surface, and the pressure surface on a leading edge side of the nozzle vane has, in a cross-section including a normal direction of a camber line of the nozzle vane and the vane height direction, a concave shape from a position of the first end surface to a middle position between the first end surface and the second end surface.

With the above configuration (4), the pressure surface on the side of the leading edge of the nozzle vane has a concave shape from the position of the first end surface to the middle position, and thus, even in a case where the pressure surface is oblique as described above (1), the throat formed between adjacent nozzle vanes is likely to be relatively narrow at the position of the first end surface compared to the middle position. Thus, it is possible to reduce the exhaust gas flow (throat flow) passing by the first end surface side of the throat, and to suppress generation of swirls due to interaction between the above throat flow and the clearance flow. Further, with the above configuration (4), the pressure surface on the side of the leading edge of the nozzle vane has a concave shape from the position of the first end surface to the middle position, and thus, the throat width is likely to become relatively wider at a position closer to the middle position from the position of the first end surface. Thus, even when the opening degree of the nozzle vane is small, it is possible to ensure a throat area, and thus it is possible to ensure a suitable flow rate of exhaust gas at the throat.

Thus, with the above configuration (4), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(5) In some embodiments, in any one of the above configurations (1) to (4), the nozzle vane has: a first end surface which is one of the shroud-side end surface or the hub-side end surface; and a second end surface which is the other of the shroud-side end surface or the hub-side end surface. The nozzle vane is rotatably supported on one of the hub-side wall surface or the shroud-side wall surface which faces the second end surface, and a throat formed between adjacent two of the nozzle vanes has a narrower throat width at a position of the first end surface than a throat width at a middle position between the first end surface and the second end surface.

With the above configuration (5), the throat formed between the nozzle vanes tends to have a throat width that is narrower at the position of the first end surface of the nozzle vane facing the clearance than at the middle position.

That is, the throat has a relatively narrow throat width on the side of the first end surface of the nozzle vane, and thus it is possible to reduce the exhaust gas flow passing by the first end surface of the throat. Thus, it is possible to suppress generation of swirls due to interaction between the throat flow and the clearance flow. Further, since the throat has a relatively wide throat width in the vicinity of the middle position, it is possible to ensure a throat area even when the opening degree of the nozzle vanes is small, and to ensure a sufficient flow rate of exhaust gas that passes between the nozzle vanes.

Thus, with the above configuration (5), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(6) In some embodiments, in the above configuration (5), the throat width monotonically increases with an increase in a distance from the position of the first end surface toward the middle position.

With the above configuration (6), between the position of the first end surface and the middle position, the throat width is narrowest at the position of the first end surface and gradually widens from the first end surface toward the middle position. Thus, it is possible to effectively reduce the flow of exhaust gas that passes through the throat on the side of the first end surface, while ensuring a throat area. Thus, it is possible to effectively reduce swirls generated from interaction between the throat flow and the clearance flow of exhaust gas, while ensuring a flow rate of exhaust gas that flows through the throat.

(7) A nozzle vane for a turbocharger according to at least one embodiment of the present invention includes: a vane body having a shroud-side end surface and a hub-side end surface; and a rotatable shaft to rotate the vane body. The vane body has a pressure surface which is, at least within a positional range in a vane height direction including the shroud-side end surface, oblique toward a side of a pressure surface of the vane body with a distance in the vane height direction from the shroud-side end surface.

When the plurality of nozzle vanes according to the above (7) are provided for the turbocharger 1, the pressure surface of the vane body is oblique toward the downstream side of exhaust gas with an increase in the distance from the shroud-side end surface, at least on the shroud side (that is, the pressure surface of the vane body is oblique so that the shroud-side end surface is positioned on the upstream side). Thus, even under operational conditions with a low exhaust-gas flow rate, it is possible to suppress deflection of the flow of exhaust gas flowing into the turbine toward the shroud side. Thus, the flow-velocity distribution of exhaust gas flowing into the turbine becomes more uniform, which makes it possible to reduce mixing loss which may be generated after passing through the turbine blade, and to suppress uneven distribution of work between the hub side and the shroud side of the turbine blade. Thus, with the above configuration (7), it is possible to improve the turbine efficiency under operational conditions where the opening degree of the nozzle vane is small.

(8) In some embodiments, in the above configuration (7), when an x-axis is taken along a normal direction of a camber line of the vane body from the pressure surface toward a suction surface of the vane body, and a y-axis is taken along the vane height direction from the hub-side end surface toward the shroud-side end surface, coordinates $(x_s, y_s)$ of the suction surface on a trailing edge side of the vane body and coordinates $(x_p, y_p)$ of the pressure surface on a leading edge side of the vane body satisfy the following relational expression within a positional range in the vane height direction including the shroud-side end surface:

$$0 < \frac{dy_s}{dx_s} < \frac{dy_p}{dx_p}$$

In the above configuration (8), the slope $(dy_s/dx_s)$ of the suction surface on the side of the trailing edge of the vane body is smaller than the slope $(dy_p/dx_p)$ of the pressure surface on the side of the leading edge of the vane body, within the positional range in the vane height direction (y-axis direction) including the shroud-side end surface. Thus, when the plurality of nozzle vanes of the above (8) are disposed in the turbocharger, the throat formed between the nozzle vanes has a narrower throat width at the position of the shroud-side end surface of the nozzle vane, than at the position closer to the hub from the shroud-side end surface.

That is, the throat has a relatively narrow throat width at the position of the shroud-side end surface of the nozzle vane, and thus it is possible to reduce the exhaust gas flow passing by the shroud side of the throat. Thus, in a case where the clearance is formed between the nozzle vane and the shroud-side wall surface, it is possible to suppress generation of swirls due to interaction between the throat flow passing by the shroud side of the throat and the clearance flow. Further, since the throat has a relatively wide throat width at a position closer to the hub from the shroud-side end surface, it is possible to ensure a throat area even when the opening degree of the nozzle vane is small, and to ensure a sufficient flow rate of exhaust gas that passes between the nozzle vanes.

Thus, with the above configuration (8), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(9) In some embodiments, in the above configuration (7) or (8), the vane body has: a first end surface which is one of the shroud-side end surface or the hub-side end surface; and a second end surface which is the other of the shroud-side end surface or the hub-side end surface. The rotatable shaft is disposed on the second end surface, and the suction surface on a trailing edge side of the vane body has, in a cross-section including a normal direction of a camber line of the vane body and the vane height direction, a concave shape from a position of the first end surface to a middle position between the first end surface and the second end surface.

In the above configuration (9), the suction surface on the side of the trailing edge of the vane body has a concave shape from the position of the first end surface to the middle position. Thus, when the plurality of nozzle vanes of the above (9) are disposed in the turbocharger, the throat formed between the nozzle vanes tends to have a throat width that is narrower at the position of the first end surface of the nozzle vane facing the clearance than at the middle position between the opposite end surfaces (the first end surface and the second end surface) of the nozzle vane.

That is, the throat has a relatively narrow throat width on the side of the first end surface of the nozzle vane, and thus it is possible to reduce the exhaust gas flow passing by the first end surface of the throat. Thus, it is possible to suppress generation of swirls due to interaction between the throat flow and the clearance flow. Further, since the throat has a relatively wide throat width in the vicinity of the middle position, it is possible to ensure a throat area even when the opening degree of the nozzle vane is small, and to ensure a sufficient flow rate of exhaust gas that passes between the nozzle vanes.

Thus, with the above configuration (9), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(10) In some embodiments, in any one of the above configurations (7) to (9), the vane body has: a first end surface which is one of the shroud-side end surface or the hub-side end surface; and a second end surface which is the other of the shroud-side end surface or the hub-side end surface. The rotatable shaft is disposed on the second end surface, and the pressure surface on a leading edge side of the vane body has, in a cross-section including a normal direction of a camber line of the vane body and the vane height direction, a concave shape from a position of the first end surface to a middle position between the first end surface and the second end surface.

With the above configuration (10), the pressure surface on the side of the leading edge of the vane body has a concave shape from the position of the first end surface to the middle position. Thus, when the plurality of nozzle vanes of the above (10) are disposed in the turbocharger, even in a case where the pressure surface is oblique as described above (7), the throat formed between adjacent nozzle vanes is likely to be relatively narrow at the position of the first end surface compared to the middle position. Thus, it is possible to reduce the exhaust gas flow (throat flow) passing by the first end surface side of the throat, and to suppress generation of swirls due to interaction between the above throat flow and the clearance flow. Further, with the above configuration (10), the pressure surface on the side of the leading edge of the vane body has a concave shape from the position of the first end surface to the middle position, and thus, the throat width is likely to become relatively wider at the middle position than at the position of the first end surface. Thus, it is possible to ensure a throat area even when the opening degree of the nozzle vane is small, and it is possible to ensure a suitable flow rate of exhaust gas at the throat.

Thus, with the above configuration (10), it is possible to reduce swirls generated from interaction between the throat flow and the clearance flow of exhaust gas, while ensuring a flow rate of exhaust gas that flows through the throat, even when the opening degree of the nozzle vane is small, and improve the turbine efficiency at the time when the opening degree of the nozzle vane is small.

(11) A turbine according to at least one embodiment of the present invention includes: a nozzle vane according to any one of the above (7) to (10); and a turbine wheel disposed on a downstream side of the nozzle vane.

With the above configuration (11), the pressure surface of the vane body is oblique toward the downstream side of exhaust gas with distance from the shroud-side end surface, at least on the shroud side (that is, the pressure surface of the vane body is oblique so that the shroud-side end surface is positioned on the upstream side). Thus, even under operational conditions with a low exhaust-gas flow rate, it is possible to suppress deflection of the flow of exhaust gas flowing into the turbine toward the shroud side. Thus, the flow-velocity distribution of exhaust gas flowing into the turbine becomes more uniform, which makes it possible to reduce mixing loss which may be generated after passing through the turbine blade, and to suppress uneven distribution of work between the hub side and the shroud side of the turbine blade. Thus, with the above configuration (11), it is possible to improve the turbine efficiency under operational conditions where the opening degree of the nozzle vane is small.

Advantageous Effects

According to at least one embodiment of the present invention, it is possible to provide a turbocharger, a nozzle vane for a turbocharger, and a turbine, whereby it is possible to improve the turbine efficiency at the time when the opening degree of the nozzle vane is small.

BRIEF DESCRIPTION OF DRAWINGS

FIG. 3C is a cross-sectional view at the trailing edge side of the nozzle vane shown in

FIG. 3A.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Firstly, the overall configuration of a turbocharger according to some embodiments will be described.

Figure 1:
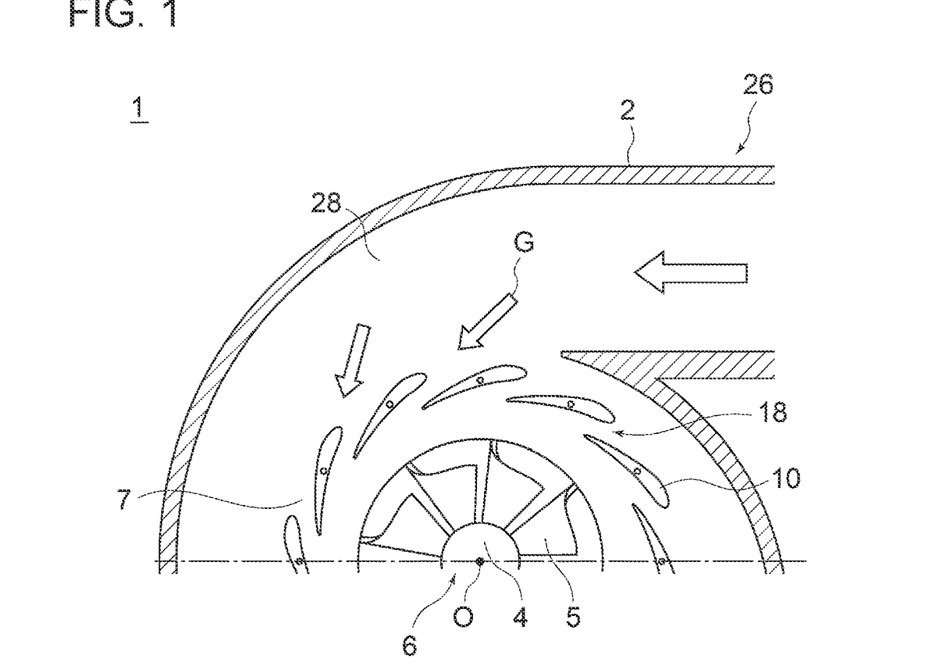
FIG. 1 is a partial schematic cross-sectional view of an upper half section of a turbocharger according to an embodiment.
Figure 2:
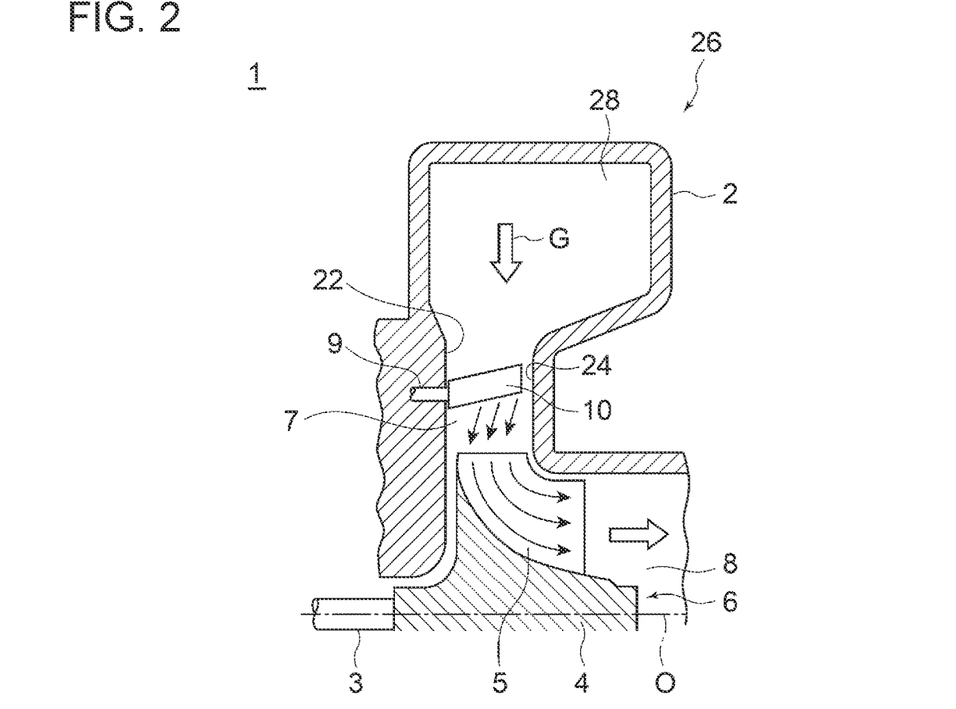
FIG. 2 is a schematic cross-sectional view of a turbocharger according to an embodiment, taken along the rotational axis of the turbocharger.

FIG. 1 is a partial schematic cross-sectional view of an upper half section of a turbocharger according to an embodiment. FIG. 2 is a schematic cross-sectional view of a turbocharger according to an embodiment, taken along the direction of the rotational axis O of the turbocharger.

As shown in FIGS. 1 and 2, the turbocharger 1 includes a turbine 26 including a turbine wheel 6 configured to be rotary driven by exhaust gas from an engine (not shown), and a compressor (not shown) connected to the turbine 26 via a rotary shaft 3. The compressor is configured to be driven coaxially by rotation of the turbine wheel 6 to compress intake air to the engine.

While the turbine 26 shown in FIGS. 1 and 2 is a radial-inflow type axial turbine into which exhaust gas serving as a working fluid flows in the radial direction, the operation type of the turbine 26 is not limited to this. For instance, in some embodiments, the turbine 26 may be a mixed-flow turbine in which a working fluid has both radial and axial velocity components.

The turbine wheel 6 includes a hub 4 coupled to the rotary shaft 3, and a plurality of rotor blades 5 disposed in the circumferential direction on the outer peripheral surface of the hub 4. The turbine wheel 6 is accommodated in the turbine housing 2, and a scroll flow path 28 into which exhaust gas is introduced from the engine is formed by the turbine housing 2, on the radially outer side of the turbine wheel 6. Further, as shown in FIG. 2, on the radially inner side of the scroll flow path 28, a flow path 7 of exhaust gas flowing into the turbine wheel 6 from the scroll flow path 28 is formed by a hub-side wall surface 22 and a shroud-side wall surface 24 which are wall surfaces of the turbine housing 2 and which face each other. The hub-side wall surface 22 is a wall surface positioned on the radially inner side of the rotor blade 5 (closer to the hub 4), and the shroud-side wall surface 24 is a wall surface positioned on the radially outer side of the rotor blade 5 (farther from the hub 4).

In the embodiment shown in FIGS. 1 and 2, in the flow path 7, a plurality of nozzle vanes (vane bodies) 10 are disposed rotatably on the hub-side wall surface 22 via rotatable shafts 9. As the rotatable shafts 9 rotate, the vane angle of the nozzle vanes changes, and thereby it is possible to adjust the opening degree of the nozzle vanes 10.

A clearance C (see FIG. 2) is formed between the nozzle vanes 10 and the shroud-side wall surface 24 facing the hub-side wall surface 22 on which the rotatable shafts 9 of the nozzle vanes 10 are disposed. The clearance C is disposed so as to have such a size that the nozzle vanes 10 can slide smoothly on the wall surface.

Further, in another embodiment, the plurality of nozzle vanes may be disposed on the shroud-side wall surface 24, and the clearance C may be formed between the nozzle vanes 10 and the hub-side wall surface 22 facing the shroud-side wall surface 24.

Alternatively, in another embodiment, the plurality of nozzle vanes 10 may be supported rotatably on both of the hub-side wall surface 22 and the shroud-side wall surface 24, via rotatable shafts of the respective nozzle vanes 10 disposed on both of the hub-side end surface and the shroud-side end surface. In this case, the clearance maybe disposed between the hub-side wall surface 22 and the nozzle vanes 10, or between the shroud-side wall surface 24 and the nozzle vanes 10, or between the hub-side wall surface 22 and the nozzle vanes 10 and between the shroud-side wall surface 24 and the nozzle vanes 10.

In the turbocharger 1 having the above configuration, exhaust gas G after flowing through the scroll flow path 28 flows into the flow path 7 formed between the hub-side wall surface 22 and the shroud-side wall surface 24, where the nozzle vanes 10 control the flow direction of the exhaust gas and then flows into the turbine wheel 6 to rotary drive the turbine wheel 6. Further, exhaust gas having finished work at the turbine wheel 6 is discharged outside from the outlet 8.

In the above described turbocharger 1, between adjacent nozzle vanes 10 of the plurality of nozzle vanes 10, a throat 18 (see FIG. 1) is formed, at a position where the distance between the two nozzle vanes 10 is shortest.

Next, the nozzle vanes 10 according to some embodiments, and the throat 18 formed between adjacent nozzle vanes 10 in the turbocharger 1 will be described in detail.

Figure 3A:
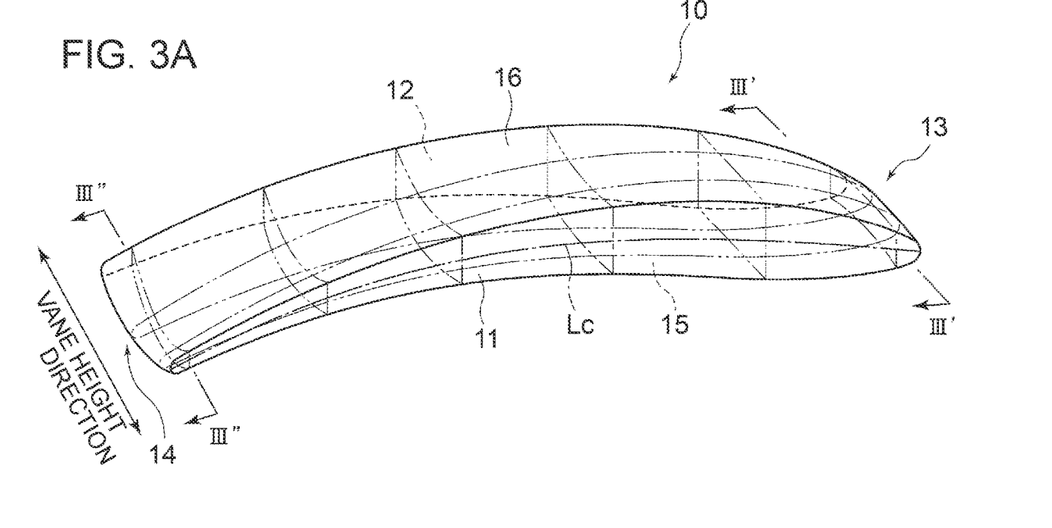
FIG. 3A is a perspective view of a nozzle vane (vane body) according to an embodiment.
Figure 3B:
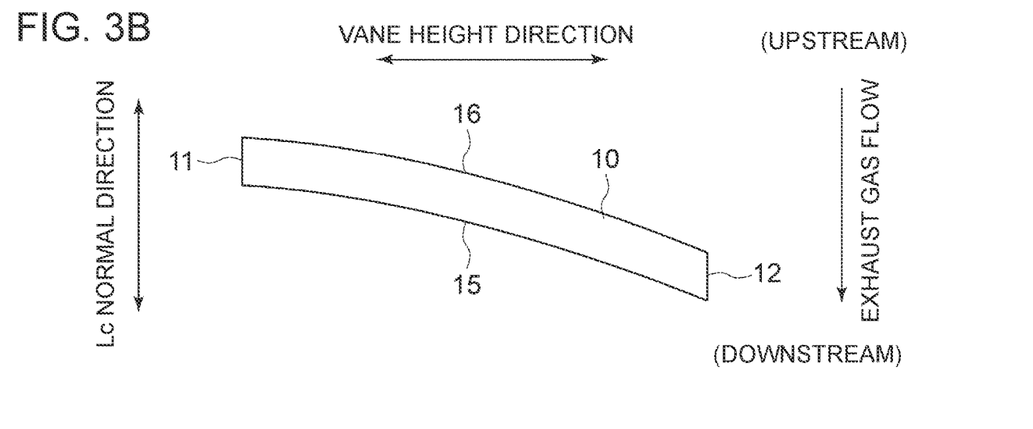
FIG. 3B is a cross-sectional view at the leading edge side of the nozzle vane shown in FIG. 3A.
Figure 3C:
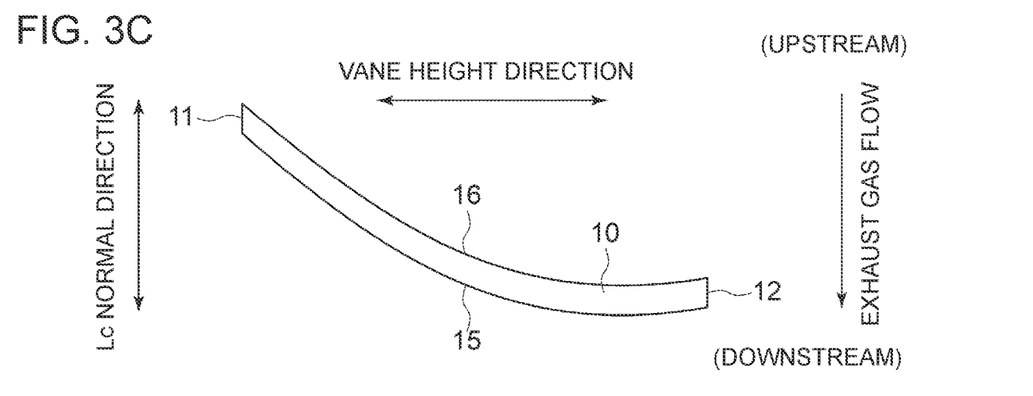
Figure 4:
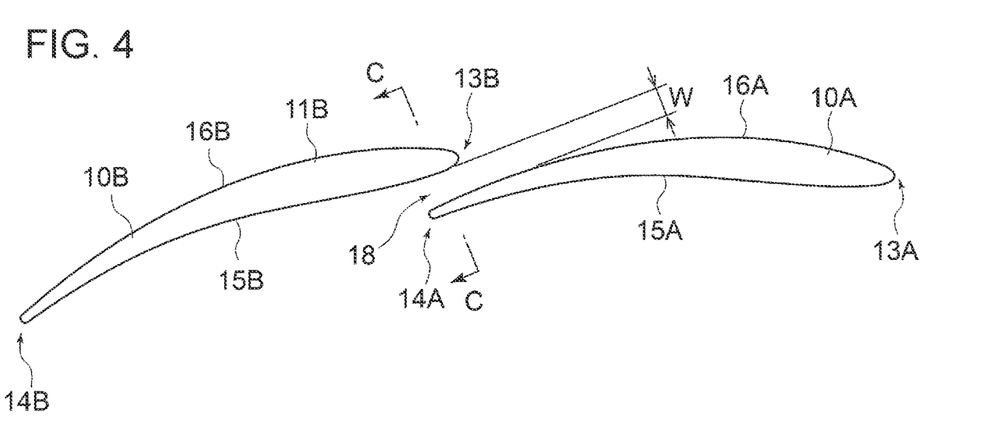
FIG. 4 is a configuration diagram of adjacent nozzle vanes of a turbocharger.

FIG. 3A is a perspective view of a nozzle vane (vane body) 10 according to an embodiment. FIG. 3B is a cross-sectional view on the leading edge side of the nozzle vane 10 shown in FIG. 3A (taken along line III'-III' in FIG. 3A). FIG. 3C is a cross-sectional view on the trailing edge side of the nozzle vane 10 shown in FIG. 3A (taken along line III"-III" in FIG. 3A). FIG. 4 is a configuration diagram of nozzle vanes 10 disposed adjacent to each other in the turbocharger 1.

Further, FIGS. 3B and 3C are each a cross-sectional view taken along a plane including the normal direction of the camber line Lc (see FIG. 3A) of the nozzle vane 10 and the vane height direction (direction connecting the shroud-side end surface 11 and the hub-side end surface 12).

As shown in FIGS. 3A to 3C, the nozzle vane (vane body) 10 includes a shroud-side end surface 11 that faces the shroud-side wall surface 24, a hub-side end surface 12 that faces the hub-side wall surface 22, and an airfoil portion extending between the shroud-side end surface 11 and the hub-side end surface 12, when the nozzle vane 10 is mounted to the turbocharger 1. The nozzle vane 10 has a leading edge 13 and a trailing edge 14 from the shroud-side end surface 11 to the hub-side end surface 12. Further, the nozzle vane 10 includes a pressure surface 15 extending from the leading edge 13 to the trailing edge 14, and a suction surface 16 extending from the leading edge 13 to the trailing edge 14, the suction surface 16 facing the pressure surface 15.

In some embodiments, the pressure surface 15 of the nozzle vane (vane body) 10 is oblique toward the pressure surface 15 of the nozzle vane 10 (that is, from the suction surface 16 toward the pressure surface 15 of the nozzle vane 10), with distance from the shroud-side end surface 11 in the vane height direction, within a positional range in the vane height direction including at least the shroud-side end surface 11.

In a case where the above nozzle vane 10 is disposed in the flow path 7 of the turbocharger 1 as shown in FIG. 2, the pressure surface 15 of the nozzle vane 10 is oblique toward the downstream side of exhaust gas in the flow path 7, with distance from the shroud-side end surface 11 in the vane height direction, at least on the shroud side where the shroud-side wall surface 24 is disposed. That is, on the shroud side, the pressure surface 15 of the nozzle vane 10 is disposed most upstream at the position of the shroud-side end surface 11, and is positioned further downstream toward the hub side with distance from the shroud-side end surface 11.

For instance, as shown in FIGS. 3A to 3C, the pressure surface 15 of the nozzle vane (vane body) 10 is oblique toward the pressure surface 15 of the nozzle vane 10 (that is, from the suction surface 16 toward the pressure surface 15 of the nozzle vane 10), with distance 'd' from the shroud-side end surface 11 in the vane height direction, in a positional range in the vane height direction from the position Ps of the shroud-side end surface 11 to the position Pt between the position Ps and the position Ph of the hub-side end surface 12.

Furthermore, in a case where the above nozzle vane 10 shown in FIGS. 3A to 3C is disposed in the flow path 7 of the turbocharger 1 as shown in FIG. 2, on the shroud side where the shroud-side wall surface 24 is disposed, the pressure surface 15 of the nozzle vane 10 is oblique toward the downstream side of exhaust gas in the flow path 7, with an increase in the distance 'd' from the shroud-side end surface 11 in the vane height direction, from the position Ps of the shroud-side end surface 11 to the above described position Ph positioned closer to the hub from the position Ps. That is, the pressure surface 15 of the nozzle vane 10 is disposed most upstream at the position Ps of the shroud-side end surface 11, and is positioned further downstream toward the hub side with an increase in the distance 'd' from the shroud-side end surface 11, thereby being positioned most downstream at the position Pt between the shroud-side end surface 11 and the hub-side end surface 12.

Figure 11:
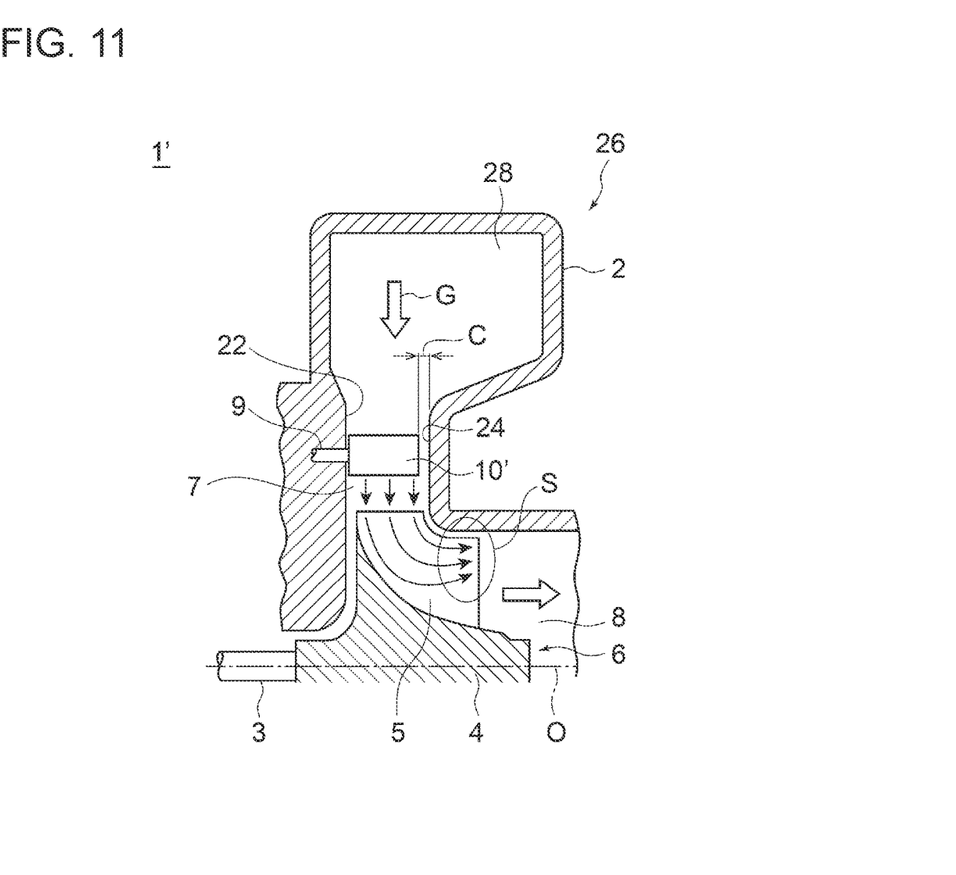
FIG. 11 is a schematic cross-sectional view of a typical turbocharger, taken along the rotational shaft of the turbocharger.

FIG. 11 is a schematic cross-sectional view of a typical turbocharger 1', taken along the rotational shaft of the turbocharger 1'. The pressure surface of the nozzle vane 10' of the turbocharger 1' shown in FIG. 11 is barely oblique in the vane height direction, and has a flat shape.

In the typical turbocharger 1', under such operational conditions that the exhaust gas flow rate is low and the opening degree of the nozzle vane 10' is small, as shown in FIG. 11, a centrifugal force is applied to the flow of exhaust gas flowing toward the turbine blade (rotor blade) 5 after passing through the nozzle vane 10', and the flow is deflected toward the shroud (see section S in FIG. 11). In this case, the flow velocity of the flow of exhaust gas in the turbine wheel 6 has a flow-velocity distribution in which the flow velocity is relatively low at the hub side (the radially inner side of the rotor blade 5), and relatively high at the shroud side (the radially outer side of the rotor blade 5). In a case where the flow has the above flow-velocity distribution, when the centrifugal force is no longer applied after passing through the rotor blade 5, the flow becomes mixed to gain a uniform flow velocity, which causes mixing loss. Further, since exhaust gas tends to be deflected toward the shroud, while the exhaust gas flow performs work at the shroud side of the rotor blade 5, not much work is performed at the hub side, which may cause deterioration of the turbine efficiency.

In this regard, when the nozzle vane 10 according to the above embodiment is disposed in the turbocharger 1, the pressure surface 15 of the nozzle vane 10 is oblique toward the downstream side of exhaust gas with distance from the shroud-side end surface 11, at least on the shroud side (that is, the pressure surface 15 of the nozzle vane 10 is oblique so that the shroud-side end surface 11 is positioned on the upstream side). Thus, even under operational conditions with a low exhaust-gas flow rate, it is possible to suppress deflection of the flow of exhaust gas flowing into the turbine wheel 6 toward the shroud side. Thus, the flow-velocity distribution of exhaust gas flowing into the turbine wheel 6 becomes more uniform, which makes it possible to reduce mixing loss which may be generated after passing through the rotor blade 5, and to suppress uneven distribution of work between the hub side and the shroud side of the rotor blade 5. Thus, with the nozzle vane 10 according to the above embodiment, it is possible to improve the turbine efficiency under operational conditions where the opening degree of the nozzle vane 10 is small.

In the following description, as shown in FIG. 2, of the two end surfaces of the nozzle vanes 10, the second wall surface refers to the hub-side end surface 12 facing the hub-side wall surface 22 on which the nozzle vanes 10 are supported rotatably, and the first end surface refers to the shroud-side end surface 11 facing the clearance C.

In another embodiment, the nozzle vane (vane body) 10 may be disposed on the shroud-side wall surface 24 rotatably, and the clearance C may be formed between the nozzle vanes 10 and the hub-side wall surface 22. In this case, the first end surface refers to the hub-side end surface 12 facing the clearance C, and the second end surface refers to the shroud-side end surface 11 on which the rotatable shafts 9 are disposed. Further, in this case, for the following description, the same description can be applied by swapping the description of the hub side and the description of the shroud side.

As shown in FIG. 3B, in the nozzle vane 10 shown in FIG. 3A, the pressure surface 15 on the side of the leading edge 13 has a concave shape from the shroud-side end surface 11 to the hub-side end surface 12, in the vane height direction. Further, as shown in FIG. 3C, in the nozzle vane 10 in FIG. 3A, the suction surface 16 on the side of the trailing edge 14 has a concave shape from the shroud-side end surface 11 to the hub-side end surface 12, in the vane height direction.

In a case where a plurality of nozzle vanes 10 having the above configuration shown in FIGS. 3A to 3 are disposed in the turbocharger 1, a throat 18 is formed between adjacent nozzle vanes 10A, 10B of the plurality of nozzle vanes 10. The throat 18 is formed between the suction surface 16 on the side of the trailing edge 14A of the nozzle vane 10A and the pressure surface 15B on the side of the leading edge 13B of the nozzle vane 10B. Further, the throat 18 is formed at a position where the distance W between the adjacent nozzle vanes 10A and 10B is at the minimum.

Further, the nozzle vanes 10A, 10B shown in FIG. 4 each have the above described configuration of the nozzle vane (vane body) 10, and each include a shroud-side end surface 11A, 11B, a hub-side end surface 12A, 12B, a leading edge 13A, 13B, a trailing edge 14A, 14B, a pressure side 15A, 15B, and a suction surface 16A, 16B.

Figure 5:
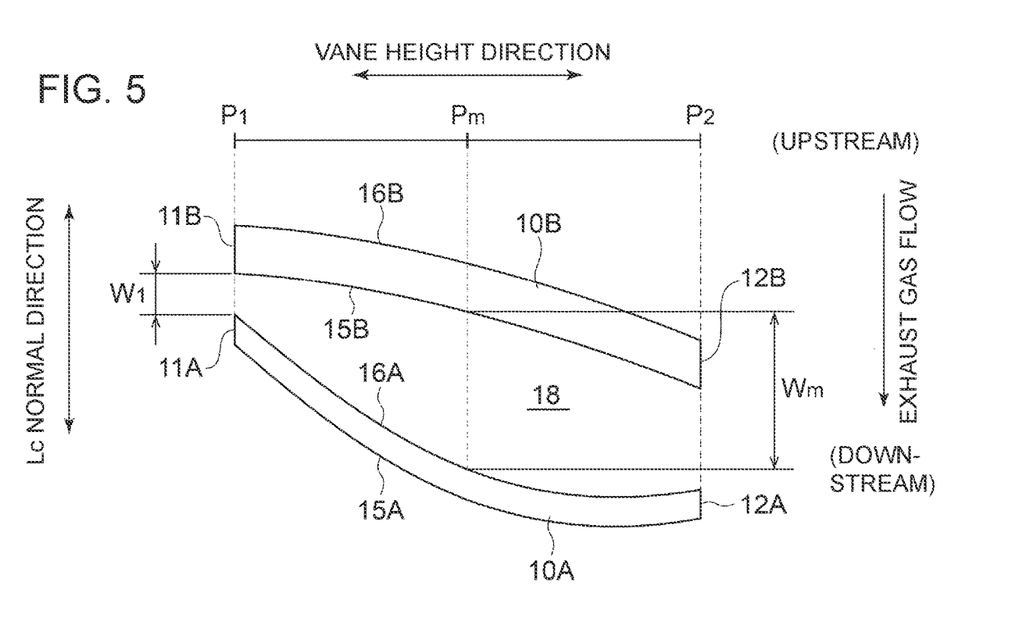
FIG. 5 is a cross-sectional view, at a throat position, of adjacent nozzle vanes according to an embodiment.

FIG. 5 is a cross-sectional view, at the position of the throat 18, of the adjacent nozzle vanes 10A, 10B having the shape shown in FIGS. 3A to 3C (corresponding to the cross section along line C-C in FIG. 4).

Figure 6:
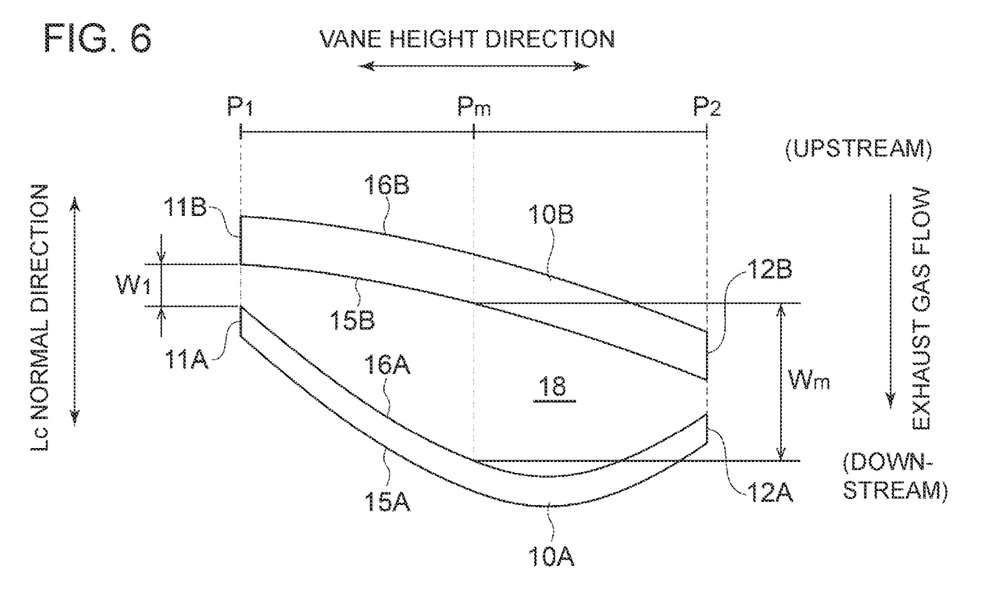
FIG. 6 is a cross-sectional view, at a throat position, of adjacent nozzle vanes according to an embodiment.
Figure 7:
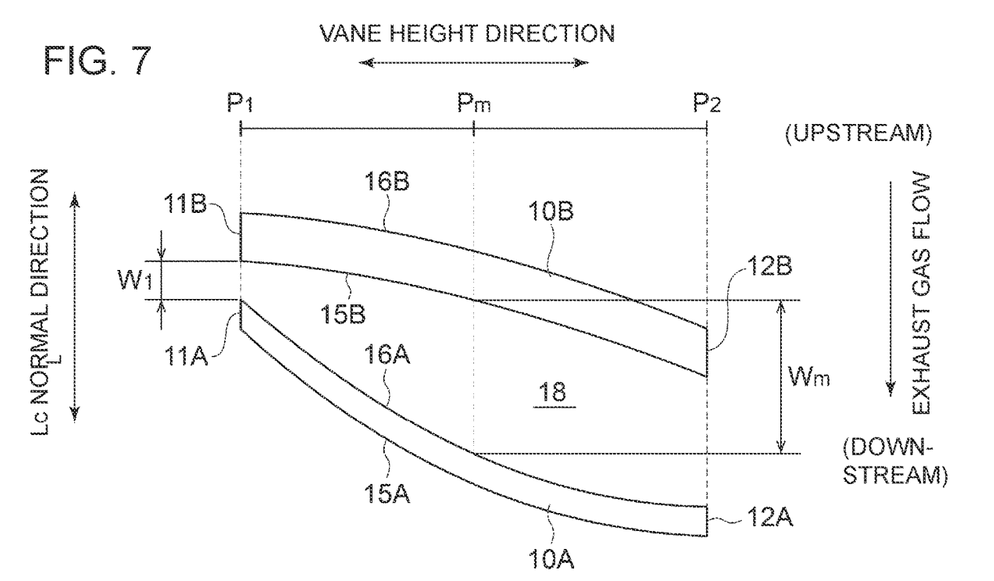
FIG. 7 is a cross-sectional view, at a throat position, of adjacent nozzle vanes according to an embodiment.
Figure 8:
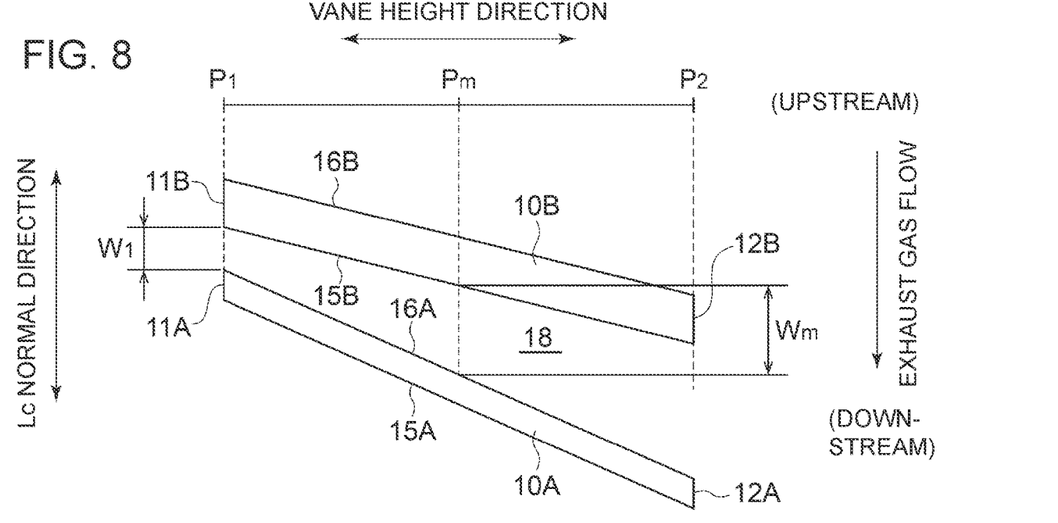
FIG. 8 is a cross-sectional view, at a throat position, of adjacent nozzle vanes according to an embodiment.

FIGS. 6 to 8 are each a cross-sectional view, at the position of the throat 18, of the adjacent nozzle vanes 10A, 10B (corresponding to the cross section along line C-C in FIG. 4), according to another embodiment. The nozzle vane 10A and the nozzle vane 10B shown in FIGS. 6 to 8 may have the same shape as a whole.

Further, FIGS. 5 to 8 are each a cross-sectional view taken along a plane including the normal direction of the camber line Lc (see FIG. 3A) of the nozzle vane 10 and the vane height direction (direction connecting the shroud-side end surface 11 and the hub-side end surface 12).

In the following description, the adjacent nozzle vanes 10A and 10B have the same shape as a premise, and the nozzle vanes 10A and 10B may be referred to as the nozzle vane 10 collectively.

In each nozzle vane 10 (10A and 10B) shown in FIGS. 6 and 7, similarly to the nozzle vane 10 shown in FIG. 5 (i.e., the nozzle vane 10 shown in FIGS. 3A to 3C), the pressure surface 15 on the side of the leading edge 13 has a concave shape and the suction surface 16 on the side of the trailing edge 14 have a concave shape, from the shroud-side end surface 11 to the hub-side end surface 12, in the vane height direction.

Further, in the nozzle vane 10 (10A and 10B) shown in FIG. 8, the pressure surface 15 on the side of the leading edge 13 and the suction surface 16 on the side of the trailing edge 14 have a flat shape from the shroud-side end surface 11 to the hub-side end surface 12, in the vane height direction.

In each nozzle vane 10 shown in FIGS. 5 to 8, in the vane height direction, the pressure surface 15 on the side of the leading edge 13 is disposed most upstream at the position $P_1$ (position Ps in FIGS. 3B and 3C) of the shroud-side end surface 11, which is the first end surface, and is positioned further downstream toward the hub side with distance from the shroud-side end surface 11, thereby being positioned most downstream at the position $P_2$ (Ph shown in FIGS. 3B and 3C) of the hub-side end surface 12, which is the second end surface.

In each nozzle vane 10 shown in FIGS. 5 and 6, the suction surface 16 on the side of the trailing edge 14 has a shape protruding most toward the pressure surface 15, at a position between the middle position Pm between the shroud-side end surface 11 and the hub-side end surface 12 and the position $P_2$ of the hub-side end surface 12 (second end surface), in the vane height direction. In the case of the nozzle vane 10 in FIG. 6, the throat width (distance between the pressure surface 15 on the side of the leading edge 13 and the suction surface 16 on the side of the trailing edge 14) at the position $P_2$ of the hub-side end surface 12 (second end surface) is not greater than a half of the throat width at the middle position Pm.

In each nozzle vane 10 shown in FIGS. 7 and 8, the suction surface 16 on the side of the trailing edge 14 is disposed most upstream at the position $P_1$ (position Ps in FIGS. 3B and 3C) of the shroud-side end surface 11, which is the first end surface, and is positioned further downstream toward the hub side with distance from the shroud-side end surface 11, thereby being positioned most downstream at the position $P_2$ (Ph shown in FIGS. 3B and 3C) of the hub-side end surface 12, which is the second end surface.

In some embodiments, as shown in FIGS. 5 to 8, at the throat 18 formed between the adjacent nozzle vanes 10A, 10B, the throat width $W_1$ at the position $P_1$ of the shroud-side end surface 11 (first end surface facing the clearance) is narrower than the throat width Wm at the middle position Pm between the position $P_1$ of the shroud-side end surface 11 (first end surface) and the position $P_2$ of the hub-side end surface (second end surface) (i.e., $W_1$<Wm).

Figure 10:
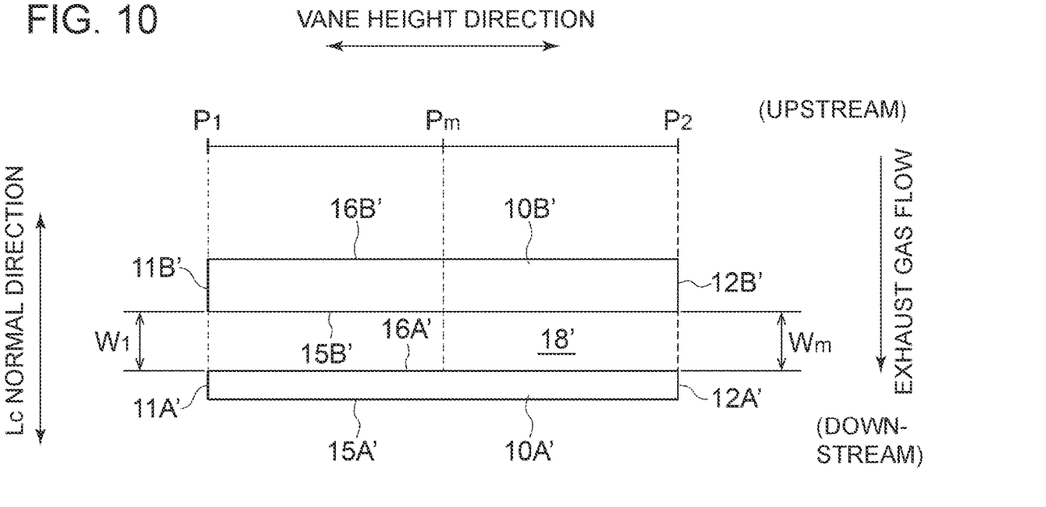
FIG. 10 is a cross-sectional view, at a throat position, of typical adjacent nozzle vanes.

FIG. 10 is a cross-sectional view, at a throat position, of typical adjacent nozzle vanes (corresponding to the cross section take along line C-C in FIG. 4). The typical nozzle vanes 10A', 10B' shown in FIG. 10 each include a shroud-side end surface 11A', 11B', a hub-side end surface 12A', 12B', a leading edge 13A', 13B', a trailing edge 14A', 14B', a pressure side 15A', 15B', and a suction surface 16A', 16B'.

The suction surface 16A' on the trailing edge side of the nozzle vane 10A' and the pressure surface 15B' on the leading edge side of the nozzle vane 10B' each have a flat shape from the shroud-side end surface 11A', 11B', to the hub-side end surface 12A', 12B'. Further, at the shroud side, the suction surface 16A' on the trailing edge side of the nozzle vane 10A' and the pressure surface 15B' on the leading edge side of the nozzle vane 10B' are substantially not oblique with distance from the shroud-side end surface 11A', 11B' in the vane height direction. Thus, at the throat 18' formed between the suction surface 16A' on the trailing edge side of the nozzle vane 10A' and the pressure surface 15B' on the leading edge side of the nozzle vane 10B', the throat width $W_1$ at the position $P_1$ of the shroud-side end surface 11 (first end surface) is substantially equal to the throat width Wm at the middle position Pm between the position $P_1$ of the shroud-side end surface 11' (first end surface) and the position $P_2$ of the hub-side end surface 12' (second end surface).

In the turbocharger, to ensure a certain flow rate while reducing the opening degree of the nozzle vane, it is necessary to ensure a certain throat area for the throat formed between adjacent nozzle vanes.

Herein, in a case where the nozzle vanes are typical nozzle vanes 10A', 10B' as shown in FIG. 10, with regard to the throat 18' formed between the nozzle vanes 10A', 10B', the throat width $W_1$ at the position P1 of the shroud-side end surface 11' facing the clearance and the throat width Wm at the middle position Pm are substantially equal.

Thus, even under operational conditions where the opening degree of the nozzle vane is small, the throat width $W_1$ is relatively large, and thus the flow of exhaust gas (throat flow) passing through the vicinity of the clearance of the throat 18' between the nozzle vanes 10A', 10B' is not suppressed much. Thus, swirls are likely to be generated due to interaction between the throat flow and the exhaust gas flow (clearance flow) passing through the clearance formed between the nozzle vane 10A' or 10B' and the wall surface forming the exhaust gas flow path (shroud-side wall surface or the hub-side wall surface), which may deteriorate the turbine efficiency.

In this regard, in the case of the throat 18 formed between the nozzle vanes 10A, 10B according to the embodiments shown in FIGS. 5 to 8, the throat width $W_1$ at the position $P_1$ of the shroud-side end surface 11A, 11B facing the clearance is narrower than the throat width Wm at the middle position Pm.

That is, the throat 18 has a relatively narrow throat width $W_1$ on the side of the shroud-side end surface 11A, 11B (first end surface) of the nozzle vane 10A, 10B, and thus it is possible to reduce the exhaust gas flow (throat flow) passing by the first end-surface side of the shroud-side end surface 11A, 11B of the throat 18 (i.e. vicinity of clearance). Thus, it is possible to suppress generation of swirls due to interaction between the throat flow and the clearance flow. Further, since the throat 18 has a relatively wide throat width Wm in the vicinity of the middle position Pm, it is possible to ensure a throat area even when the opening degree of the nozzle vanes 10A, 10B is small, and to ensure a sufficient flow rate of exhaust gas that passes between the nozzle vanes 10A, 10B.

Thus, as shown in FIGS. 5 to 8, with the throat width $W_1$ at the position $P_1$ of the shroud-side end surface 11A, 11B (first end surface) being narrower than the throat width Wm at the middle position Pm, it is possible to reduce swirls generated due to the interaction between the throat flow and the clearance flow of exhaust gas while ensuring the flow rate of exhaust gas that passes through the throat 18, even when the opening degree of the nozzle vanes 10A, 10B is small, and thereby it is possible to improve the turbine efficiency at the time when the opening degree of the nozzle vanes 10A, 10B is small.

In some embodiments, as shown in FIGS. 5 to 8, the throat width of the throat 18 formed between the nozzle vanes 10A, 10B monotonically increases with distance from the position $P_1$ of the shroud-side end surface 11, from the position $P_1$ of the shroud-side end surface 11 (first end surface) toward the middle position Pm.

In this case, between the position $P_1$ of the shroud-side end surface 11 (first end surface) and the middle position Pm, the throat width is narrowest at the position $P_1$ of the shroud-side end surface 11, and gradually widens from the shroud-side end surface 11 toward the middle position Pm. Thus, it is possible to effectively reduce the flow of exhaust gas that passes through the throat 18 on the side of the shroud-side end surface 11 (first end surface) facing the clearance, while ensuring a throat area. Thus, it is possible to effectively reduce swirls generated from interaction between the throat flow and the clearance flow of exhaust gas, while ensuring a flow rate of exhaust gas that flows through the throat.

In some embodiments, as shown in FIGS. 5 to 7, the suction surface 16 on the side of the trailing edge 14 of the nozzle vane 10 has a concave shape at least from the position $P_1$ of the shroud-side end surface 11 (first end surface) to the middle position Pm, in a cross section including the normal direction of the camber line Lc of the nozzle vane 10 and the vane height direction.

FIGS. 5 to 8 are each a cross-sectional view at the position of the throat 18 of the two nozzle vanes 10A, 10B. Thus, strictly speaking, the cross section may not always include the normal direction of the camber line Lc of the nozzle vane 10A, 10B. Still, in a region where the opening degree of the nozzle vanes 10A, 10B is small, the cross section is along the normal direction of the camber line Lc.

In this case, the suction surface 16A on the side of the trailing edge 14 of the nozzle vane 10 has a concave shape from the position $P_1$ of the shroud-side end surface 11 (first end surface) to the middle position Pm, and thus, with regard to the throat 18 formed between the suction surface 16A and the pressure surface 15 on the side of the leading edge 13B of the nozzle vane 10B, the throat width $W_1$ at the position $P_1$ is likely to be narrower than the throat width Wm at the middle position Pm. Thus, it is possible to effectively reduce swirls generated from interaction between the throat flow and the clearance flow of exhaust gas, while ensuring a flow rate of exhaust gas that flows through the throat 18.

In some embodiments, as shown in FIGS. 5 to 7, the pressure surface 15 on the side of the leading edge 13 of the nozzle vane 10 has a concave shape at least from the position $P_1$ of the shroud-side end surface 11 (first end surface) to the middle position Pm, in a cross section including the normal direction of the camber line Lc of the nozzle vane 10 and the vane height direction.

In this case, the pressure surface 15 on the side of the leading edge 13 of the nozzle vane 10 has a concave shape from the position $P_1$ of the shroud-side end surface 11 (first end surface) to the middle position Pm, and thus, even in a case where the pressure surface 15 is oblique as described above, the throat 18 formed between adjacent nozzle vanes 10A, 10B is likely to be relatively narrow at the position $P_1$ of the shroud-side end surface 11 (first end surface) compared to the middle position Pm. Thus, it is possible to reduce the exhaust gas flow (throat flow) passing by the shroud side (first end surface side) of the throat 18, and to suppress generation of swirls due to interaction between the above throat flow and the clearance flow. Further, in this case, the pressure surface 15 on the side of the leading edge 13 of the nozzle vane 10 has a concave shape from the position $P_1$ of the shroud-side end surface 11 (first end surface) to the middle position Pm, and thus, the throat width is likely to become relatively wider at a position closer to the middle position Pm from the position $P_1$ of the first end surface. Thus, it is possible to ensure a throat area even when the opening degree of the nozzle vane 10 is small, it is possible to ensure a suitable flow rate of exhaust gas at the throat.

Thus, it is possible to reduce swirls generated from interaction between the throat flow and the clearance flow of exhaust gas, while ensuring a flow rate of exhaust gas that flows through the throat 18, even when the opening degree of the nozzle vane 10 is small, and improve the turbine efficiency at the time when the opening degree of the nozzle vane 10 is small.

Figure 9A:
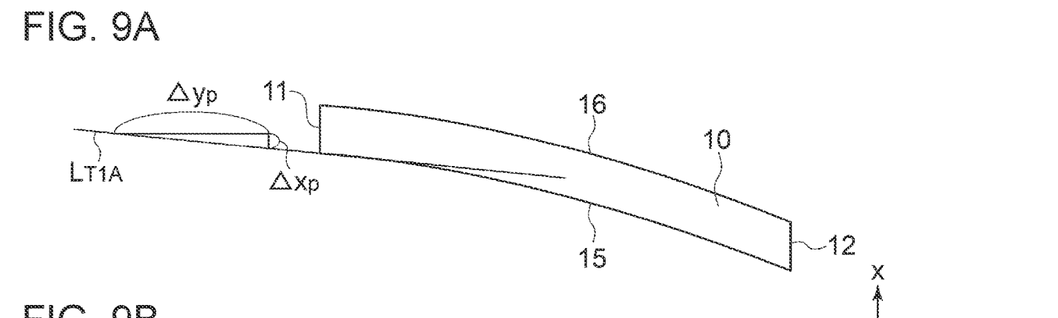
FIG. 9A is a cross-sectional view at the leading edge side of the nozzle vane shown in FIG. 3A, shown in a xy-coordinate system.
Figure 9B:
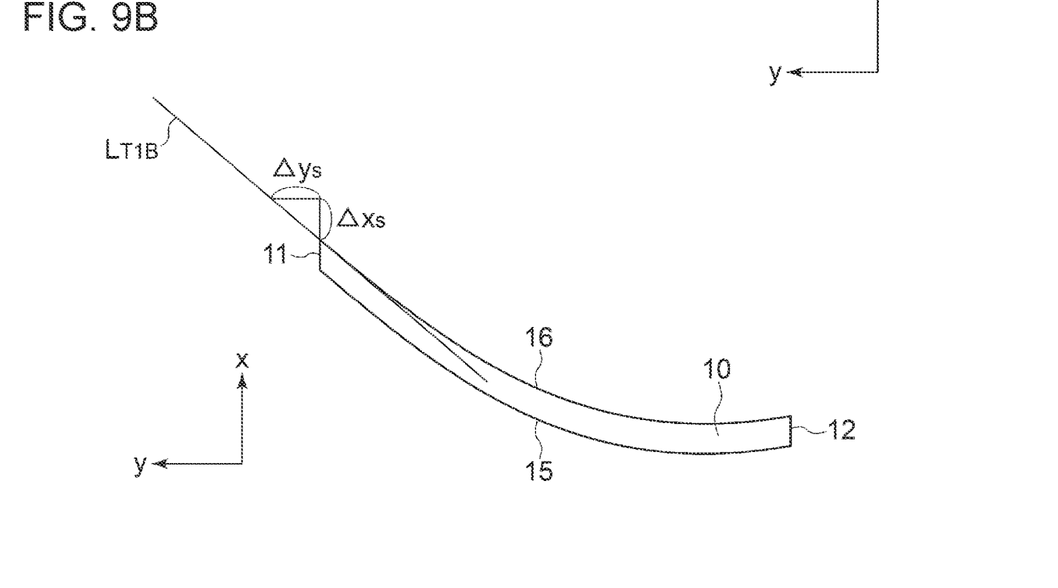
FIG. 9B is a cross-sectional view at the trailing edge side of the nozzle vane shown in FIG. 3A, shown in a xy-coordinate system.

FIGS. 9A and 9B are each a cross-sectional view on the side of the leading edge 13 and the side of the trailing edge 14 of the nozzle vane 10 shown in FIG. 3A (i.e. nozzle vane 10 shown in FIG. 5), shown in a xy-coordinate system, corresponding to FIGS. 3B and 3C respectively. In the xy-coordinate system of FIGS. 9A and 9B, x-axis is an axis extending from the pressure surface 15 toward the suction surface 16 along the normal direction of the camber line Lc (see FIG. 3A) of the nozzle vane 10, and y-axis is the axis extending from the hub-side end surface 12 (second end surface) toward the shroud-side end surface 11 (first end surface) along the vane height direction.

The line $L_{T1A}$ in FIG. 9A is a line indicating the slope of the coordinates $(x_p, y_p)$ of the pressure surface 15 on the side of the leading edge 13, at the position of the shroud-side end surface 11 (first end surface). Further, the line $L_{T1B}$ in FIG. 9B is a line indicating the slope of the coordinates $(x_s, y_s)$ of the suction surface 16 on the side of the trailing edge 14, at the position of the shroud-side end surface 11 (first end surface).

In some embodiments, as shown in FIGS. 9A and 9B, on the above described xy-coordinate system, within the positional range in the vane height direction (y-axis direction) including the shroud-side end surface 11 (first end surface), the slope $(dy_s/dx_s)$ of the coordinates $(x_s, y_s)$ of the suction surface 16 on the side of the trailing edge 14 of the nozzle vane 10 (see FIG. 9B) is smaller than the slope $(dy_p/dx_p)$ of the coordinates $(x_p, x_y)$ of the pressure surface 15 on the side of the leading edge 13 of the nozzle vane 10 (see FIG. 9A). Herein, the slope $(dy_s/dx_s)$ of the coordinates $(x_s, x_y)$ of the suction surface 16 on the side of the trailing edge 14 of the nozzle vane 10 is greater than zero.

Further, although not depicted, also in the case of the nozzle vane 10 according to the embodiment shown in FIGS. 6 to 8, similarly to the case shown in FIGS. 9A and 9B, on the above described xy-coordinate system, within the positional range in the vane height direction (y-axis direction) including the shroud-side end surface 11 (first end surface), the slope $(dy_s/dx_s)$ of the coordinates $(x_s, y_s)$ of the suction surface 16 on the side of the trailing edge 14 of the nozzle vane 10 is smaller than the slope $(dy_p/dx_p)$ of the coordinates $(x_p, x_y)$ of the pressure surface 15 on the side of the leading edge 13 of the nozzle vane 10, and is greater than zero.

In this case, the throat 18 formed between the nozzle vanes 10 (see FIGS. 4, and 5 to 8) has a narrower throat width at the position of the shroud-side end surface 11 (first end surface) of the nozzle vane 10 facing the clearance, than at the position closer to the hub-side end surface 12 (second end surface) from the shroud-side end surface 11.

That is, the throat 18 has a relatively narrow throat width at the position of the shroud-side end surface 11 (first end surface) of the nozzle vane 10, and thus it is possible to reduce the exhaust gas flow (throat flow) passing by the side of the shroud-side end surface 11 (first end surface) of the throat 18 (throat flow). Thus, it is possible to suppress generation of swirls due to interaction between the throat flow and the clearance flow. Further, since the throat 18 has a relatively wide throat width at a position closer to the hub-side end surface 12 (second end surface) from the shroud-side end surface 11, it is possible to ensure a throat area even when the opening degree of the nozzle vane is small, and to ensure a sufficient flow rate of exhaust gas that passes between the nozzle vanes 10.

Thus, it is possible to reduce swirls generated from interaction between the throat flow and the clearance flow of exhaust gas, while ensuring a flow rate of exhaust gas that flows through the throat 18, even when the opening degree of the nozzle vane 10 is small, and improve the turbine efficiency at the time when the opening degree of the nozzle vane 10 is small.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Turbocharger
2 Turbine housing
3 Rotary shaft
4 Hub
5 Rotor blade
6 Turbine wheel
7 Flow path
8 Outlet
9 Rotatable shaft
10, 10A, 10B Nozzle vane (vane body)
11, 11A, 11B Shroud-side end surface
12, 12A, 12B Hub-side end surface
13, 13A, 13B Leading edge
14, 14A, 14B Trailing edge
15, 15A, 15B Pressure surface
16, 16A, 16B Suction surface
18 Throat
22 Hub-side wall surface
24 Shroud-side wall surface
26 Turbine
28 Scroll flow path
C Clearance
G Exhaust gas
Lc Camber line

The invention claimed is:

1. A turbocharger comprising:
a turbine wheel;
a hub-side wall surface and a shroud-side wall surface which face each other and which together form a flow path for exhaust gas to flow into the turbine wheel; and
a nozzle vane which has a shroud-side end surface facing the shroud-side wall surface and a hub-side end surface facing the hub-side wall surface and which is rotatably disposed in the flow path,
wherein the nozzle vane has a pressure surface which is, at least on a shroud side, oblique toward a downstream side of the exhaust gas with a distance in a vane height direction from the shroud-side end surface, and
wherein an x-axis is taken along a normal direction of a camber line of the nozzle vane from the pressure surface toward a suction surface of the nozzle vane, and a y-axis is taken along the vane height direction from the hub-side end surface toward the shroud-side end surface, coordinates $(x_s, y_s)$ of the suction surface on a trailing edge side of the nozzle vane and coordinates $(x_p, y_p)$ of the pressure surface on a leading edge side of the nozzle vane satisfy the following relational expression within a positional range in the vane height direction including the shroud-side end surface:

$$0 < \frac{dy_s}{dx_s} < \frac{dy_p}{dx_p}.$$

2. The turbocharger according to claim 1,
wherein the nozzle vane has:
a first end surface which is one of the shroud-side end surface or the hub-side end surface; and
a second end surface which is the other of the shroud-side end surface or the hub-side end surface,
wherein the nozzle vane is rotatably supported on one of the hub-side wall surface or the shroud-side wall surface which faces the second end surface, and
wherein the suction surface on a trailing edge side of the nozzle vane has, in a cross-section including a normal direction of a camber line of the nozzle vane and the vane height direction, a concave shape from a position of the first end surface to a middle position between the first end surface and the second end surface.

3. The turbocharger according to claim 1,
wherein the nozzle vane has:
a first end surface which is one of the shroud-side end surface or the hub-side end surface; and
a second end surface which is the other of the shroud-side end surface or the hub-side end surface,
wherein the nozzle vane is rotatably supported on one of the hub-side wall surface or the shroud-side wall surface which faces the second end surface, and
wherein the pressure surface on a leading edge side of the nozzle vane has, in a cross-section including a normal direction of a camber line of the nozzle vane and the vane height direction, a concave shape from a position of the first end surface to a middle position between the first end surface and the second end surface.

4. The turbocharger according to claim 1,
wherein the nozzle vane has:
a first end surface which is one of the shroud-side end surface or the hub-side end surface; and
a second end surface which is the other of the shroud-side end surface or the hub-side end surface, wherein the nozzle vane is rotatably supported on one of the hub-side wall surface or the shroud-side wall surface which faces the second end surface, and wherein a throat formed between adjacent two of the nozzle vanes has a narrower throat width at a position of the first end surface than a throat width at a middle position between the first end surface and the second end surface.

5. The turbocharger according to claim 4, wherein the throat width monotonically increases with an increase in a distance from the position of the first end surface toward the middle position.

6. A nozzle vane for a turbocharger, comprising:
a vane body having a shroud-side end surface and a hub-side end surface; and
a rotatable shaft to rotate the vane body,
wherein the vane body has a pressure surface which is, at least within a positional range in a vane height direction including the shroud-side end surface, oblique toward a side of a pressure surface of the vane body with a distance in the vane height direction from the shroud-side end surface, and
wherein an x-axis is taken along a normal direction of a camber line of the vane body from the pressure surface toward a suction surface of the vane body, and a y-axis is taken along the vane height direction from the hub-side end surface toward the shroud-side end surface, coordinates ($x_s$, $y_s$) of the suction surface on a trailing edge side of the vane body and coordinates ($x_p$, $y_p$) of the pressure surface on a leading edge side of the vane body satisfy the following relational expression within a positional range in the vane height direction including the shroud-side end surface:

$$0 < \frac{dy_s}{dx_s} < \frac{dy_p}{dx_p}.$$

7. The nozzle vane for a turbocharger according to claim 6,
wherein the vane body has:
a first end surface which is one of the shroud-side end surface or the hub-side end surface; and
a second end surface which is the other of the shroud-side end surface or the hub-side end surface,
wherein the rotatable shaft is disposed on the second end surface, and
wherein the suction surface on a trailing edge side of the vane body has, in a cross-section including a normal direction of a camber line of the vane body and the vane height direction, a concave shape from a position of the first end surface to a middle position between the first end surface and the second end surface.

8. The nozzle vane for a turbocharger according to claim 6,
wherein the vane body has:
a first end surface which is one of the shroud-side end surface or the hub-side end surface; and
a second end surface which is the other of the shroud-side end surface or the hub-side end surface,
wherein the rotatable shaft is disposed on the second end surface, and
wherein the pressure surface on a leading edge side of the vane body has, in a cross-section including a normal direction of a camber line of the vane body and the vane height direction, a concave shape from a position of the first end surface to a middle position between the first end surface and the second end surface.

9. A turbine, comprising:
a nozzle vane according to claim 6; and
a turbine wheel disposed on a downstream side of the nozzle vane.

* * * * *